Sept. 27, 1966 J. CHERNIAVSKYJ 3,275,257
SPINDLE ADAPTER FOR SUPER 8 SUPPLY REEL
Filed March 1, 1965
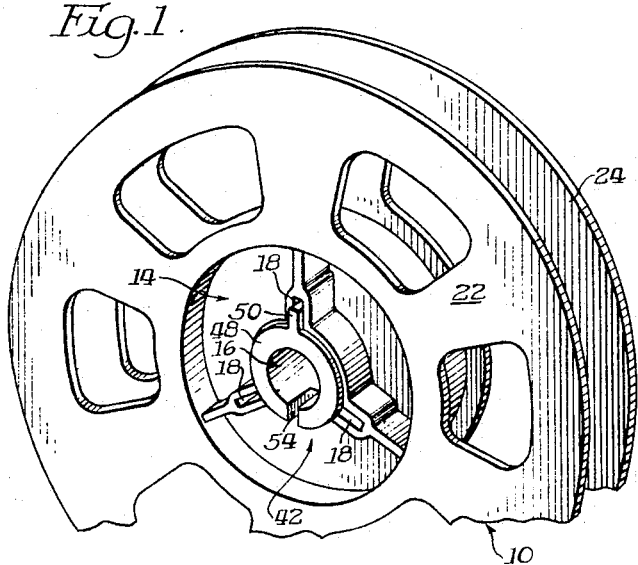
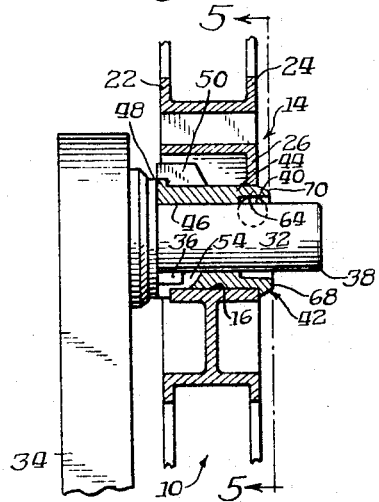
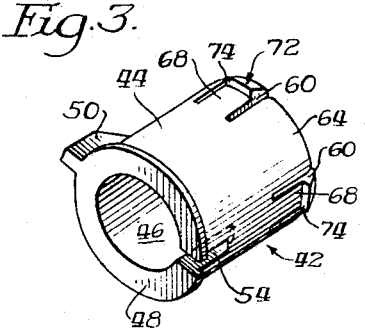
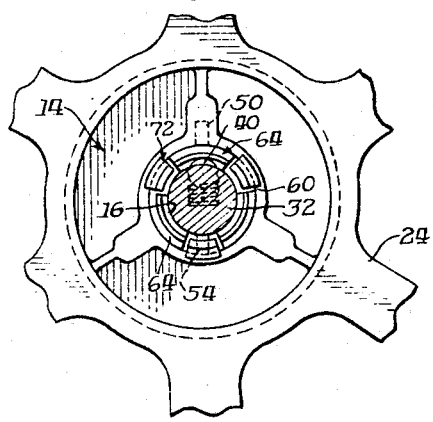
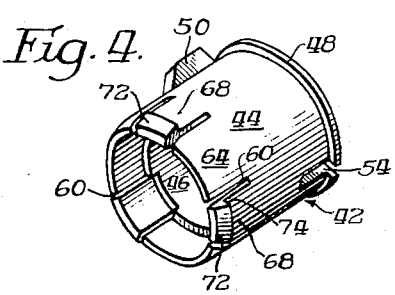
Inventor:
Jaroslav Cherniavskyj
By Barry L. Clark
John E. ... Jr. Attys

United States Patent Office 3,275,257
Patented Sept. 27, 1966

3,275,257
SPINDLE ADAPTER FOR SUPER 8 SUPPLY REEL
Jaroslav Cherniavskyj, Skokie, Ill., assignor to Bell & Howell Company, Chicago, Ill., a corporation of Illinois
Filed Mar. 1, 1965, Ser. No. 436,053
5 Claims. (Cl. 242—71.8)

The instant invention relates to an adapter for enabling either of two diameters of 8 mm. motion picture film reels to be used on a single spindle. The adapter is particularly useful in that it permits a standard 8 mm. projector spindle having a diameter of .3 inches to be used with a Super 8 film spool having a diameter of .5 inches. Since the width of film is the same in both the standard and Super 8 formats, it is possible to design a projector to be compatible with both formats. The Super 8 format equipment has been generally designed to prevent inadvertent interchange of components such as reels with their respective equivalents in the standard format systems. However, with compatible projectors, it is desirable to be able to use reels of either film format on a single projector. Because the spindles of projectors intended to accept reels on which the standard format film is wound are much smaller in diameter than the spindles of the projectors intended to accept only the reels upon which the new Super 8 format film is wound, the hubs of the respective reels are similarly of different diameters. For a user to most conveniently use a compatible projector, he must therefore either interchange the spindles, rewind all his films upon one type of reel, or be provided with an adapter wherein the reel having the larger hub may be used upon the smaller spindle, while using the reel with the correct sized hub on the spindle in the usual manner. Because such adapters are readily misplaced, they must be economical and easily manufactured in quantity.

Thus, it is a primary object of the present invention to provide an adapter to adapt the reel of Super 8 format equipment for use upon a spindle of standard format equipment.

To better understand this invention and to ascertain other objects, features, and advantages thereof, reference should be made to the following detailed description of certain preferred embodiments thereof taken in conjunction with the accompanying drawings in which:

FIG. 1 discloses a portion of a Super 8 reel with a novel adapter positioned in the hub thereof;

FIG. 2 is a partial sectional view of the reel and the adapter mounted on a standard projector spindle;

FIGS. 3 and 4 are enlarged perspective views of the adapter; and

FIG. 5 is a sectional view taken along line 5—5 of FIG. 2 disclosing the adapter positioned in the reel.

In FIG. 1 is disclosed a reel 10 having a hub 14. Formed axially through the hub is a spindle opening 16, the diameter of which is based upon the dimensional standards for the equipment for the Super 8 format. The hub is provided with a plurality of radially extending recesses 18. These recesses or keyways are open axially of the hub from one of a pair of flanges 22, 24 formed with the opposite ends of the hub. A wall 26 closes the recesses on the opposing axial side adjacent the other of the flanges.

Disclosed in FIG. 2 is a spindle 32 of the conventional type having a diameter based upon the dimensional standards for equipment of the standard format. The spindle extends from a projector arm casing 34 so that it may be driven through components enclosed in the casing. A key 36 extends radially from one side of the spindle adjacent the arm. The spindle which is generally cylindrical has a slightly rounded head portion 38 which tends to guide a reel or other element for positioning on the spindle. The key 36 operates to drive the element(s) supported on the spindle when the spindle is driven in a conventional manner, and to prevent relative rotation of that element about the spindle if sufficient friction is not developed between the interior of the element and the exterior of the spindle. A ball detent member 40 is retained adjacent the end of the spindle remote from the arm. The detent member is biased outwardly of the spindle to assist in holding the reel on the spindle while enabling ready removal of the reel, when desired.

An adapter 42, which is preferably formed of a deformable and moldable material, such as polypropylene has a substantially hollow cylindrical body portion 44. This body portion is dimensioned with an interior diameter or spindle receiving aperture 46 slightly greater than the diameter of spindle 32, and with an exterior diameter slightly less than the diameter of the spindle opening 16 in the hub of reel 10. These dimensions enable the adapter to be inserted on or in the respective cooperating elements in frictional engagement therewith while permitting ready removal therefrom. Integrally formed with the body 44 is a thin rim portion or axial movement restrainer member 48. The diameter of the exterior circumference is greater than the diameter of the exterior of the body portion and also greater than the diameter of the spindle opening 16 of reel 10. The rim prevents entry of the adapter into the reel hub spindle opening other than in a predetermined orientation of the adapter relative to the reel. This particular orientation of the adapter is necessary because of a lug 50 extending substantially radially from the exterior of the body portion adjacent the end to which the rim portion 48 is formed. The lug is intended to seat in one of the recesses 18 in the reel hub 14 with the extent of entry into the recess limited by the rim 48.

A slot or key receiving recess portion 54 extends through the rim portion 48 and into the body portion 44 in at least one point about the circumference of the body portion, angularly spaced from lug 50. When the reel with the adapter located therein is placed on spindle 32, the adapter will be oriented until the spindle key 36 can enter the slot 54. The adapter 42 is then moved longitudinally of the spindle to its normal operating position. The cooperation between the key 36 of spindle 32 and slot 54 of adapter 42, lug 50 of adapter 42 and the selected recess 18 of the reel 10 eliminate any possible rotation of one of the elements relative to another and assure positive drive of the reel by the spindle.

The forward or spindle hole entry portion of the body 44 of adapter 42 is provided with a plurality of slits 60, which extend to a depth of approximately one third the longitudinal dimension of the adapter. The forward end of the adapter is therefore formed into a plurality of independently movable arms 64, 68. The interior portion of each of these arms is reduced substantially such that the arms are approximately one half the thickness of the body portion along substantially the length of the respective arms. The reduction in material thickness of the arms reduces the inherent rigidity of the material due to the thickness of the body enabling the arm portions to be flexed. Arms 68 are preferably reduced so as to have a slightly greater degree of flexibility than arms 64 due to their intended functions. The arms 64 are preferably positioned alternately with the arms 68.

Arms 64 are formed with their leading ends slightly tapered as seen at 70, while arms 68 are each provided with an externally formed releasable retaining portion 72 creating shoulders 74 adjacent the forward ends thereof. The spacing between the interior of the rim portion 48 of the adapter and the shoulders 74 is essentially equivalent to the longitudinal dimension of the hub 14 of reel 10 to enable the adapter to fit snugly within the spindle opening without axial play. When the adapter is inserted into the spindle opening with lug 50 aligned with one of the recesses 18, the retaining portions 72 are forced slightly inwardly from their normal positions to approximate the interior diameter of the reel spindle opening 16, thus enabling the adapter to be axially pushed therethrough. When the adapter is fully seated in the spindle opening, shoulders 74 clear the edge of the hub and extend outwardly thereover sufficiently to normally retain the adapter in its seated position. The application of a slight axial force against the forward end of the adapter while retaining the reel stationary will enable the operator to readily overcome the resistance of the arms 68 to enable the shoulders to be pushed beyond the hub end to a point intermediate the axial length of the hub. Subsequently, rim 48 of the adapter may be grasped to be pulled from the spindle opening.

Thus, it is readily seen that a novel adapter has been disclosed which is economical to manufacture and which is capable of transmitting the light torque of a projector spindle to a reel supported on the spindle by the intermediary of the adapter. The adapter is capable of insertion in the reel spindle opening from only one direction. The reel with the adapter inserted therein may then be mounted on the projector spindle in only one direction. The pair of keyways and slots cooperate to insure the proper orientaton as well as to insure positive transmission of torque from the spindle to the reel which is essentially concentrically supported thereon. Thus, a film wound on the the reel will necessarily be placed on the projector in the desired manner.

It is to be understood that modifications and variations may be effected without departing from the scope of the novel concepts of the present invention.

I claim:

1. An adapter for use with a rotatable spindle having a key thereon and a reel having a hub with a spindle opening therethrough, the spindle opening being of a diameter greater than the diameter of said spindle, said hub having a keyway opening into the spindle opening, the adapter comprising:

a substantially cylindrical body portion having a wall thickness of substantially the difference between the exterior diameter of the spindle and the interior diameter of the reel spindle opening;

a restrainer member having at least one portion of greater diameter than said spindle opening formed about an end of said body portion;

key means extending radially outwardly from said body portion to cooperate with said hub keyway;

said body portion having a recess adapted to cooperate with said spindle key; and releasable retaining means formed integrally in the end of said body portion opposite said retainer member whereby said adapter may be inserted into said reel spindle opening and fixed against axial and rotative movement relative to said reel hub and reel spindle.

2. An adapter for use with a rotatable spindle having a key thereon and a reel having a hub with a spindle opening therethrough, the spindle opening being of a diameter greater than the diameter of said spindle, said hub having a keyway opening into the spindle opening, the adapter comprising:

a substantially cylindrical body portion having a thickness of substantially the difference between the exterior diameter of the spindle and the interior diameter of the reel spindle opening;

an enlarged rim portion about an end of said body portion limiting the axial movement of said body portion in said spindle opening;

lug means extending from said body portion beyond said rim portion to cooperate with said hub keyway when properly oriented relative to said reel;

said body portion having a recess adapted to cooperate with said spindle key when properly oriented relative to said spindle; and releasable retaining means formed integral with the end of said body portion opposite said rim portion wherein said adapter may be inserted and retained in said reel spindle opening, whereby said reel with said adapter therein is substantially concentrically supported on said spindle for rotation therewith, relative rotation therebetween being restrained when said adapter is properly oriented relative to said reel and said spindle.

3. An adapter for use with a rotatable spindle having a key thereon and a reel having a hub with a spindle opening therethrough the spindle opening being of a diameter greater than the diameter of said spindle, said hub having a keyway opening into the spindle opening, said hub having a keyway opening into the spindle opening, said hub having reel and said spindle, said interconnection being obtainable by a single orientation of said reel, adapter and spindle; the adapter comprising:

a body portion having a thickness of substantially the difference between the exterior diameter of the spindle and the interior diameter of the reel spindle opening;

a restrainer member formed integral with an end of said body portion limiting the axial movement of said body portion;

said restrainer member having a radial extent greater than that of said reel spindle opening;

lug means extending substantially radially from said body portion wherein said body portion is necessarily oriented when inserted in said reel spindle opening;

key receiving means in said body portion wherein said body portion is necessarily oriented when mounted on said spindle; and releasable retaining means formed on said body portion adjacent the end of said body portion opposite said restrainer member enabling said adapter to be retained in and removed from said reel spindle opening, whereby said reel with said adapter therein may be substantially concentrically supported on said spindle for rotation therewith.

4. An adapter for use with a rotatable spindle having a key thereon and a reel having a hub with a spindle opening therethrough, the spindle opening being of a diameter greater than the diameter of said spindle, said hub having a keyway opening into the spindle opening said adapter providing a positive interconnection between said reel and said spindle, said interconnection being obtainable by a single orientation of said reel, adapter and spindle; the adapter comprising:

a substantially cylindrical body portion having an inside diameter substantially equal to the diameter of said spindle and an exterior diameter substantially equal to the diameter of said reel spindle opening;

a rim portion having an exterior diameter greater than said body portion and being formed integral with said body portion about an end thereof;

lug means extending radially from said body portion to an effective exterior diameter greater than said rim portion wherein said lug means is adapted to be inserted into said hub keyway when said adapter is properly oriented relative thereto;

key receiving means formed adjacent said rim portion in said body portion adapted to receive said spindle key when said adapter is properly oriented on said spindle;

relatively flexible arm portions defined in the other end of said body portion; and shoulder means formed on at least one of said arm portions wherein said adapter may be retained in said reel spindle opening with said rim portion and said shoulder means preventing axial movement of said adapter relative to said hub, whereby said reel with said adapter therein may be substantially concentrically supported on said spindle for rotation therewith.

5. An adapter for use with a rotatable spindle having a key thereon and a reel having a hub with a spindle opening therethrough, the spindle opening being of a diameter greater than the diameter of said spindle, said hub having a keyway opening into the spindle opening, said adapter providing a positive interconnection between said reel and said spindle, said interconnection being obtainable by a single orientation of said reel, adapter and spindle; the adapter comprising:

a substantially cylindrical body portion having an inside diameter substantially equal to the diameter of said spindle and an exterior diameter substantially equal to the diameter of said reel spindle opening;

a rim portion formed integral with said body portion about an end thereof, said rim portion having an exterior diameter slightly greater than the exterior diameter of said body portion wherein axial movement of said adapter in said reel spindle opening is limited;

lug means formed integral with said body portion adjacent said rim portion;

said lug means extending radially from said body portion a distance greater than the distance to which said rim portion extends and being adapted for insertion into said hub keyway when said adapter is properly oriented;

key receiving means extending through said rim portion into said body portion;

said adapter being adapted to be oriented wherein said key receiving means is positionable on said spindle key;

arm portions defined in said body portion by a plurality of slits in the end opposite said rim portion;

at least one of said arm portions being reduced to a thickness less than that of said body portion, wherein it is more flexible than said body portion; and releasable retaining means including shoulder means formed on at least said one arm portion wherein said adapter may be removably inserted and retained in said reel spindle opening when said hub is held between said rim portion and said shoulder means, whereby said reel with said adapter therein may be substantially concentrically supported on said spindle for rotation therewith.

References Cited by the Examiner

UNITED STATES PATENTS

| | | | |
|---|---|---|---|
| 2,881,985 | 4/1959 | Overmine et al. | 242—71.8 |
| 2,925,164 | 2/1960 | Murphy | 242—71.8 X |
| 3,042,180 | 7/1962 | Bishop | 242—71.8 X |

FRANK J. COHEN, *Primary Examiner.*

N. L. MINTZ, *Assistant Examiner.*